United States Patent
Shah et al.

(10) Patent No.: US 11,015,655 B2
(45) Date of Patent: May 25, 2021

(54) BEARING SEAL ASSEMBLY INCLUDING A PULSE WHEEL

(71) Applicant: AKTIEBOLAGET SKF, Gothenburg (SE)

(72) Inventors: Dominique Shah, Bad Königshofen (DE); Volker Wendt, Üchetelhausen/Zell (DE)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 16/687,837

(22) Filed: Nov. 19, 2019

(65) Prior Publication Data

US 2020/0166082 A1    May 28, 2020

(30) Foreign Application Priority Data

Nov. 28, 2018  (DE) .......................... 102018220518.3

(51) Int. Cl.
*F16C 41/00* (2006.01)
*F16C 33/78* (2006.01)
*F16J 15/326* (2016.01)

(52) U.S. Cl.
CPC ........ *F16C 41/007* (2013.01); *F16C 33/7816* (2013.01); *F16J 15/326* (2013.01)

(58) Field of Classification Search
CPC .............. F16C 33/7816; F16C 33/7823; F16C 33/7869; F16C 33/7879; F16C 33/7883; F16C 41/00; F16C 41/007; F16C 2233/00; F16J 15/326; G01P 3/443; G01P 3/446
See application file for complete search history.

(56) References Cited

U.S. PATENT DOCUMENTS

| | | | | | |
|---|---|---|---|---|---|
| 5,458,420 | A | * | 10/1995 | Otto | F16C 33/7879 277/317 |
| 5,893,648 | A | * | 4/1999 | Smith | F16C 41/007 384/448 |
| 6,089,757 | A | * | 7/2000 | Ouchi | F16C 19/186 384/448 |
| 6,457,869 | B1 | * | 10/2002 | Smith | F16C 41/007 384/448 |
| 6,729,623 | B2 | * | 5/2004 | Visconti | F16C 33/7879 277/501 |
| 7,812,599 | B2 | * | 10/2010 | Ishii | F16C 33/78 324/207.25 |

(Continued)

*Primary Examiner* — James Pilkington
(74) *Attorney, Agent, or Firm* — J-Tek Law PLLC; Scott T. Wakeman; Mark A. Ussai

(57) ABSTRACT

A bearing seal assembly includes at least one seal unit and at least one pulse wheel attached to the seal unit in an interference-fit and/or a materially bonded manner. The seal unit may include a radially outer member surrounding a radially inner member, the radially inner member may have a cylindrical seal surface and a flange projecting radially outwardly from an end of the seal surface and the radially outer member may have a metal profile element at least partially covered by an elastomer body that defines a first seal lip that directly contacts the cylindrical seal surface of the radially inner member. The pulse wheel may be attached to the radially outer member by a radially inwardly directed flange of the metal profile element overlying a radially outer edge of the pulse wheel.

15 Claims, 1 Drawing Sheet

(56) References Cited

U.S. PATENT DOCUMENTS

| | | | | |
|---|---|---|---|---|
| 8,167,762 B2* | 5/2012 | Zink | .................. | G01P 3/488 |
| | | | | 475/230 |
| 2005/0007226 A1* | 1/2005 | Mizuta | ................ | G01P 3/487 |
| | | | | 335/207 |
| 2010/0007450 A1* | 1/2010 | Mizuta | ................ | G01P 3/443 |
| | | | | 335/302 |

* cited by examiner

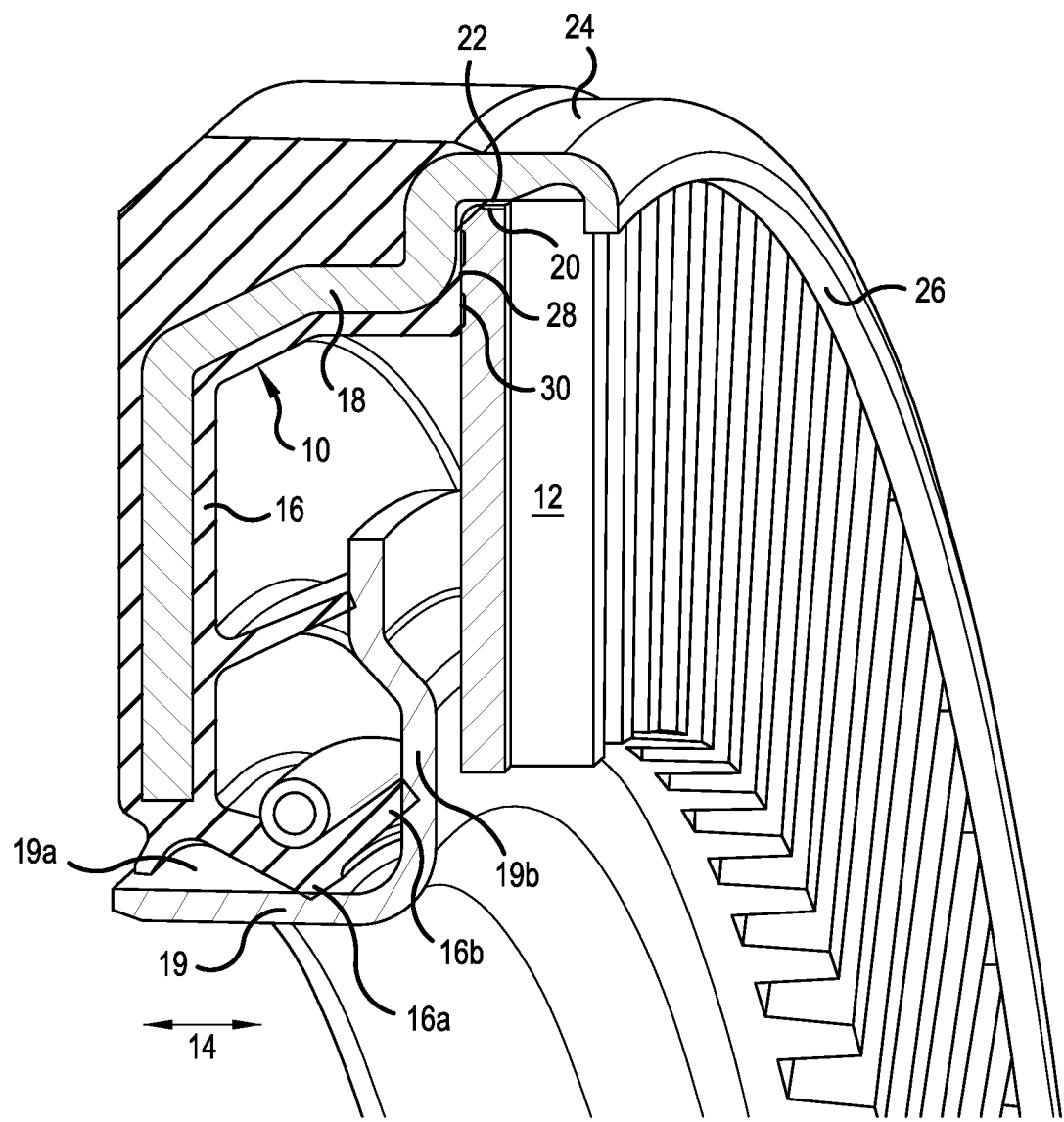

BEARING SEAL ASSEMBLY INCLUDING A PULSE WHEEL

CROSS-REFERENCE

This application claims priority to German patent application no. 10 2018 220 518.3 filed on Nov. 28, 2018, the contents of which are fully incorporated herein by reference.

TECHNOLOGICAL FIELD

The disclosure is directed to a bearing seal assembly having a pulse wheel.

BACKGROUND

An assembly including a seal unit and a pulse wheel is known. The pulse wheel is pressed into the seal unit. In a bearing assembly it is further known to dispose a seal unit, which seals the bearing assembly at one axial end, spatially spaced from a pulse wheel of the bearing assembly.

SUMMARY

An aspect of the disclosure comprises in particular to provide an assembly of the above-described type having increased efficiency.

The invention emanates from an assembly including at least one seal unit and at least one pulse wheel.

According to the disclosure, the pulse wheel is attached to the seal unit in an interference-fit and/or a materially bonded manner. According to the disclosure an increased efficiency can be achieved. In particular an economical design can be achieved. In particular, instead of pressing a seal unit into a pulse wheel, the pulse wheel can be formed from thin, cost effective metal plate, possibly of a single standard size, so that a sufficiently strong signal for determining a rotational speed of the pulse wheel is straightforwardly generated.

The assembly preferably includes at least one elastomer element that is disposed at least partially between the pulse wheel and a metallic component of the seal unit. This helps prevent manufacturing tolerances of the pulse wheel and of the metallic assembly from adding up. Furthermore a centering of the pulse wheel can be effected by the elastomer element before a final attaching of the pulse wheel to the metallic component occurs. In addition it can be achieved that with an attaching of the assembly between a hub and an inner ring of the bearing assembly by pressing, a method of this friction-fit attaching does not depend on the pulse wheel and in particular does not depend on its diameter, since a compression occurring radially inward of the seal unit during the pressing-in between hub and inner ring can be compensated for by the elastomer element.

Another aspect of the disclosure comprises a bearing seal assembly having a seal unit and a pulse wheel attached to the seal unit in an interference-fit and/or materially bonded manner. The seal unit comprises a radially outer member surrounding a radially inner member, and the radially inner member comprises a cylindrical seal surface and a flange projecting radially outwardly from an end of the seal surface. The radially outer member includes a metal profile element at least partially covered by an elastomer body that defines a first seal lip, and the first seal lip directly contacts the cylindrical seal surface of the radially inner member and is held against the cylindrical seal surface by a garter spring. The pulse wheel is attached to the radially outer member by a radially inwardly directed flange of the metal profile element overlying a radially outer edge of the pulse wheel.

Further advantages arise from the following description of the drawing. An exemplary embodiment of the invention is depicted in the drawing. The drawing, the description, and the claims contain numerous features in combination. The person skilled in the art will also advantageously consider the features individually and combine them into further meaningful combinations.

BRIEF DESCRIPTION OF THE DRAWING

FIG. 1 is a longitudinal section through a part of an assembly according to the present disclosure.

DETAILED DESCRIPTION

FIG. 1 shows a part of an inventive assembly in a state in which it can be installed by pressing it directly between a hub and an inner ring of a tapered roller bearing (not illustrated), which hub and inner ring are both part of a wheel bearing assembly, for example, of a truck. The assembly includes a seal unit 10 and a pulse wheel 12, wherein the pulse wheel 10 is attached in an interference-fit manner, and specifically with respect to axial directions 14 of the impulse wheel, to the seal unit. The pulse wheel is not moveable away from the seal unit in either the radial direction or in axial directions 14 of the pulse wheel.

The seal unit includes an outer member that includes an elastomer element 16 and a component 18 that is formed from sheet metal. The component 18 may be referred to herein as a "metal profile element". The outer member surrounds an inner member 19 that has a cylindrical seal surface 19a and a radially outwardly extending flange 19b. The elastomer element 16 includes a first seal lip 16a contacting the cylindrical seal surface 19a and a second seal lip 16b contacting the flange 19b of the inner member 19. The component 18 is rotationally symmetric and has an annular region 24 that has a larger maximum diameter than the pulse wheel. With the aid of the region 24 and of a bent region (flange) 26, the component 18 surrounds the pulse wheel. The pulse wheel is formed as a sintered ring.

The elastomer element is disposed partially between the pulse wheel and the component 18. More specifically, an annular region 22 of the elastomer element is disposed between the assembly and the pulse wheel. The region 22 includes a region 20 on its radially inner side, which region 20 is formed by a nub. Starting from the region 20 the elastomer element includes further nubs uniformly spaced from one another in the circumferential direction.

In addition to a compensating for tolerances, the elastomer element also effects a certain centering of the pulse wheel.

Furthermore the elastomer element abuts with further nubs 30 against a surface 28 of the pulse wheel extending in the radial direction and circumferential direction.

In the bearing assembly the pulse wheel is used for determining the rotational speed of the hub.

In an alternative exemplary embodiment the pulse wheel is not attached to the component in an interference-fit manner, but rather fixedly welded thereto.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved seal assemblies.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

What is claimed is:

1. A bearing seal assembly comprising:
   at least one seal unit; and
   at least one pulse wheel attached to the seal unit in an interference-fit and/or materially bonded manner,
   wherein the at least one seal unit comprises a radially outer member surrounding a radially inner member,
   wherein the radially inner member comprises a cylindrical seal surface and a flange projecting radially outwardly from an end of the seal surface;
   wherein the radially outer member includes a metal profile element at least partially covered by an elastomer body, the elastomer body defining a first seal lip, the first seal lip directly contacting the cylindrical seal surface of the radially inner member,
   wherein the pulse wheel is attached to the radially outer member by a radially inwardly directed flange of the metal profile element overlying a radially outer edge of the pulse wheel,
   wherein the flange of the radially inner member extends between the pulse wheel and a portion of the metal profile element, and
   wherein a first portion of the elastomer body extends into a radial space between the pulse wheel and the metal profile element.

2. The bearing seal assembly according to claim 1, wherein a second portion of the elastomer body is located axially between the metal profile element and the pulse wheel.

3. The bearing seal assembly according to claim 2, wherein the elastomer body includes a second seal lip in direct contact with the flange of the radially inner member.

4. A bearing seal assembly comprising:
   a seal unit comprising a metal profile element including a radially inwardly facing channel, the channel having a first radial side and a second radial side connected by an axial channel bottom, the first radial side of the channel comprising at least a portion of an axially facing surface of the metal profile element,
   an elastomer body at least partially covering the metal profile, a first portion of the elastomer body defining a seal lip of the seal unit and a second portion of the elastomer body at least partially overlying the axially facing surface of the metal profile element, and
   an annular pulse wheel in contact with the second portion of the elastomer body and having a radially outer portion mounted in the channel,
   wherein the annular pulse wheel is connected to the metal profile element in an interference-fit and/or materially bonded manner.

5. The bearing seal assembly according to claim 4, wherein the pulse wheel is fixedly welded to the metal profile element.

6. The bearing seal assembly according to claim 4, wherein the pulse wheel is a sintered ring made of corrugated metal plate.

7. The bearing seal assembly according to claim 4,
   wherein the elastomer body includes a third portion at least partially covering the axial channel bottom.

8. The bearing seal assembly according to claim 7,
   wherein the third portion of the elastomer body includes a plurality of nubs.

9. A bearing including the bearing seal assembly according to claim 4.

10. A bearing seal assembly comprising:
    a seal unit comprising a metal profile element having a radially inwardly facing channel,
    an elastomer body on an axially facing surface of the metal profile, and
    an annular pulse wheel having an axial side facing the metal profile and a radially outer portion mounted in the channel, a portion of the axial side of the annular pulse wheel contacting the elastomer body,
    wherein the annular pulse wheel and the elastomer body are connected to the metal profile element in an interference-fit and/or materially bonded manner,
    wherein the elastomer body extends into the channel, and
    wherein the elastomer body forms a seal lip of the seal unit.

11. The bearing seal assembly according to claim 10,
    wherein the elastomer body overlies at least a portion of a radially outer surface of the annular pulse wheel.

12. The bearing seal assembly according to claim 10,
    wherein the elastomer body includes a first plurality of nubs in contact with the axial face of the annular pulse wheel.

13. The bearing seal assembly according to claim 12,
    wherein the elastomer body includes a second plurality of nubs in contact with a radially outer surface of the pulse wheel.

14. The bearing seal assembly according to claim 10,
    wherein the pulse wheel is fixedly welded to the metal profile element.

15. The bearing seal assembly according to claim 10,
    wherein the pulse wheel is a sintered ring made of corrugated metal plate.

* * * * *